Oct. 30, 1945.   W. E. CHILTON   2,387,716
BRAKING SYSTEM FOR AUTOMOTIVE VEHICLES
Filed July 2, 1941
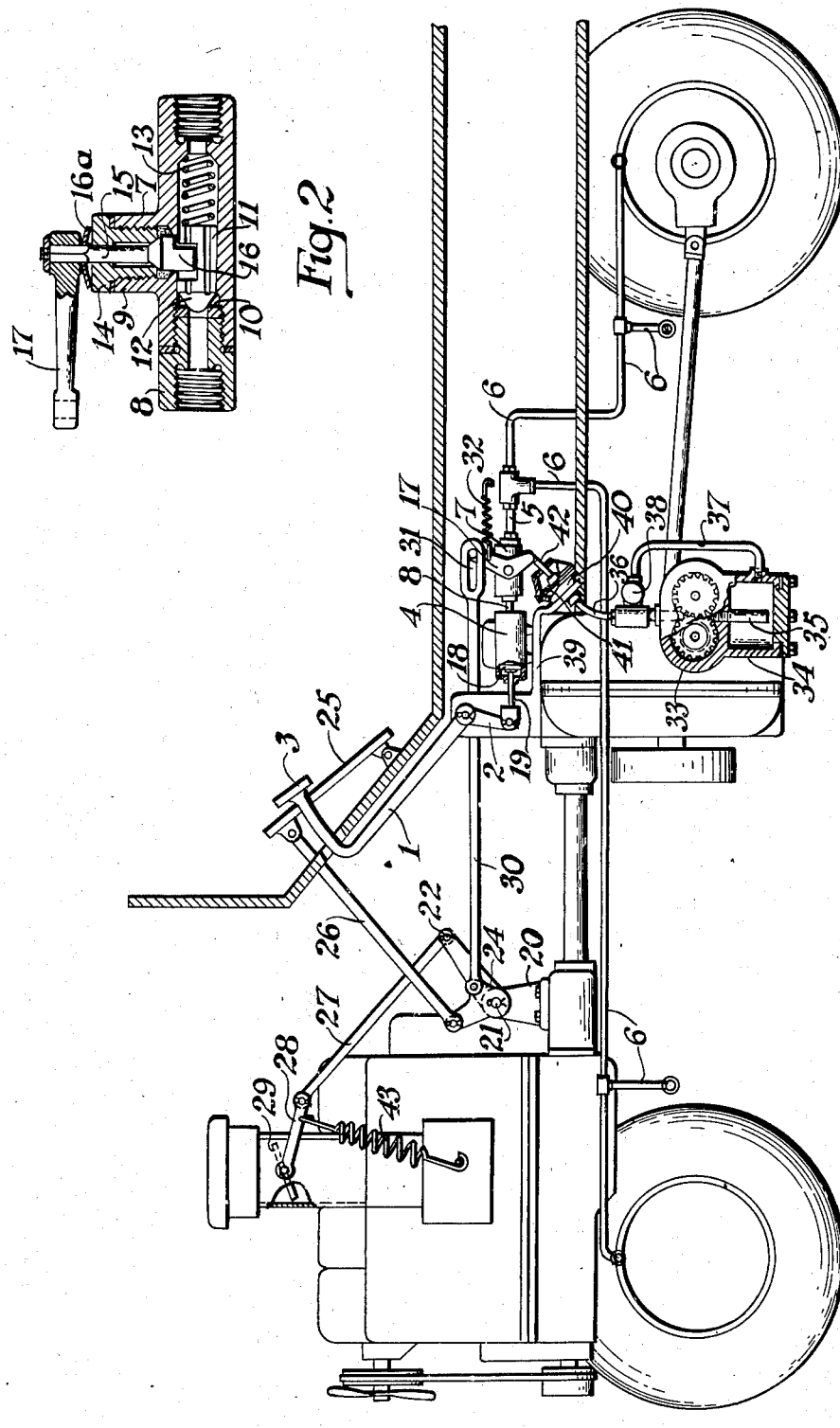
INVENTOR.
BY William E. Chilton Patented Oct. 30, 1945

2,387,716

UNITED STATES PATENT OFFICE 2,387,716

BRAKING SYSTEM FOR AUTOMOTIVE VEHICLES

William E. Chilton, Shaker Heights, Ohio

Application July 2, 1941, Serial No. 400,771

2 Claims. (Cl. 192—3)

This invention relates generally to a fluid operated braking system for automotive vehicles and one of the objects of the invention is to provide a braking system and controls therefor which are of such a nature and so disposed and arranged that the brakes may be applied and held in the applied position under predetermined conditions without interfering with the normal and usual operation of the vehicle or the brakes and without creating any hazardous or dangerous conditions which might result from the failure of the operator or driver to observe the usual precautions.

Another object of the invention is to provide a braking system for automotive vehicles which will enable the operator to apply the usual service brakes and to be assured that such brakes will remain applied until it is desired to again operate the vehicle, the releasing of the brakes being automatic and requiring no physical or mental effort or nothing more than the usual and normal operations necessary to operate the vehicle.

Another object of the invention is to provide a braking system for automotive vehicles and controls therefor which will enable the driver of the vehicle to apply the usual service brake either on the level or on an upgrade or a downgrade with the assurance that the brakes will remain applied as long as the vehicle is stationary, but will be automatically and instantly released when it is desired to proceed and without any additional physical operations or mental effort.

A further object of the invention is to provide a braking system for automotive vehicles in which the usual service brakes may be applied and held in the applied position and in which the brakes will be instantly released by the mere effort of depressing the accelerator, the system also including an additional control which will prevent locking of the brakes when the vehicle is moving in excess of a predetermined speed.

A still further object of the invention is to provide a braking system having the aforementioned distinguishing features and advantages and in which the brakes may be applied and held applied in the absence of the driver either with the motor running or stopped; and in which the mere effort of depressing the accelerator will release the brakes and which will in no way interfere with the normal use of the brakes and will not lock the same in the applied position except when it is desired to do so.

Another object of the invention is to provide a fluid braking system for automotive vehicles which includes a check valve in the pressure line leading to the individual brakes which is urged to closed position by a spring and which is unseated in one instance by the depression of the accelerator pedal, and which is unseated in another instance by an independently operable control which is responsive to the vehicle speed.

A still further object of the invention is to provide a hydraulic braking system for automotive vehicles and control units therefor which will permit the driver of the vehicle to lock the brakes in the applied position when desired, and which is provided with automatic means for instantly releasing the brakes under predetermined conditions, such means including a mechanical control operatively connected with the accelerator and an automatic pressure operated control operatively connected with the vehicle propeller shaft and serving to prevent setting of the brakes when the vehicle is moving in excess of a predetermined speed.

Another object of the invention is to provide a braking system for automotive vehicles having the hereinbefore described distinguishing features and characteristics and which is positive and dependable in operation and comprises relatively few parts and which is well adapted for production and assembly at comparatively low cost.

My improved braking system has a marked advantage when used with automotive vehicles having a fluid drive or other automatic coupling for effecting a driving connection between the vehicle power plant and wheels, as there is generally considerable torque tending to move the vehicle forward when the motor is in operation, which in many instances makes it necessary to hold the brakes applied or to disconnect the drive especially on a grade. This condition places upon the driver the burden of remembering to disconnect the drive, especially when he leaves the vehicle with the motor running which is particularly true of delivery vehicles such as milk wagons and the like where the driver must of necessity leave the vehicle with the motor running many times a day. Should the driver forget to disconnect the drive and leave the car on a grade with the motor running, a very hazardous condition exists unless the brakes are held in the applied position. Such a condition may be safely avoided with my braking system without requiring any additional physical or mental effort on the part of the driver.

Further and more limited objects of the invention will appear as the description proceeds and by reference to the accompanying drawing in which Fig. 1 is a somewhat diagrammatic or schematic view showing the several parts and elements which comprise my improved braking system the parts being shown attached to a conventional automobile; and Fig. 2 is a central sectional view of a check valve which controls the releasing of the brakes under certain predetermined conditions.

Referring now to the drawing the reference character 1 designates the usual foot-brake pedal of an automotive vehicle which is pivotally mounted on a stationary portion of the vehicle and which has a downwardly depending portion 2 and a foot receiving portion 3. Mounted on the vehicle frame in any suitable position is the usual master hydraulic brake cylinder 4 from which leads a conduit 5 having branches 6 which connect with the individual wheel brake cylinders, usually disposed adjacent each wheel. Disposed adjacent the master cylinder 4, and between the master cylinder and the wheel brake cylinders, is a brake control and releasing mechanism 7 which is connected with the master cylinder 4 at one end by a fitting 8. The brake control and releasing mechanism comprises a generally T-shaped casing 9 having intersecting bores therein which are preferably internally threaded. The fitting 8 is threadedly received in one end of the casing 9 and has formed on the inner end thereof a valve seat 10. Slidably fitting within the valve casing 9 is a valve 11 having a tapered nose portion 12 adapted to engage the valve seat 10. Also fitting within the valve casing is a coil spring 13 which normally urges the check valve toward its seat. The check valve has a recessed central portion and threadedly secured in the valve body is a plug or fitting 14, which rotatably receives a valve operating shaft or stem 15, the lower end 16 of which fits within the recess provided in the valve 11 and is shaped to provide a cam surface for operating the valve. Spring means 16a is provided for urging the stem 15 upwardly against the fitting 14 so as to prevent leakage. Non-rotatably secured to the stem 15 is an angular crank 17.

When the stem or shaft 15 is turned in one direction by the crank 17, the valve 11 is moved away from its seat against the tension of the spring 13, and when it is released, the check valve is seated by the spring 13. One end of the valve body 9 is connected directly with a master cylinder 4, and its opposite end is connected with the conduit 5, having branches 6 which lead to the wheel brake cylinders, respectively. Slidably mounted in the master cylinder is a piston 18 which is operatively connected with the depending portion 2 of the foot brake lever 1 by a link 19, so that when the brake is depressed, fluid will be expelled from the master cylinder through the fitting 8 and thence through the valve casing 9 and past the check valve 11, the pressure of the fluid serving to open the check valve against the tension of the spring 13.

When the pressure on the foot brake pedal is released, the check valve will again seat and prevent the return of the braking fluid or the release of the brakes.

Pivotally mounted on the frame of the vehicle by means of a bracket 20 is a crank 21 having arms 22 and 24. The reference character 25 designates the accelerator pedal which is connected with the arm 23 by a link 26. Connected with the arm 22 is a link 27 which connects with a link 28 which in turn is connected with the carburetor throttle valve 29. Connected with the arm 24 is a link or lever 30 the opposite end of which is provided with an elongated opening 31 and which is connected with one end of the crank 17 non-rotatably secured to the valve stem 15. The crank 17 is normally urged toward the right, as seen in Fig. 1, by a spring 32; and it will be noted that there is a lost motion connection between the link 30 and the crank 17, the purpose of which will hereinafter appear.

Disposed at some convenient position on the vehicle is a fluid pump 33 which is operatively connected to and driven from the propeller shaft of the vehicle. Carried by the pump 33 and preferably formed as a part thereof is a reserve fluid chamber 34. The pump has an intake pipe 35 and a delivery pipe 36. Leading from the discharge side of the pump to the intake side thereof is a by-pass pipe 37 which has therein an adjustable by-pass valve 38.

The reference character 39 designates a bracket which is secured to or adjacent the master cylinder 4. Carried by the bracket 39 is a small chamber or housing 40 to which the discharge pipe 36 is connected. Disposed within the chamber 40 is a diaphragm 41 to which is connected a plunger 42. The diaphragm is preferably formed of a flexible material such as "neoprene" or a similar material, which is not affected by hydrocarbons, and which is capable of withstanding substantial wear. The plunger 42 is disposed so that the outer end thereof contacts one end of the crank 17. The pump is preferably driven from the vehicle propeller shaft and is operated at a relatively low speed and pressure, and is of such character and design that when the vehicle is driven at a low speed the pressure in the line 36 will be insufficient to open the check valve; but when the speed of the vehicle exceeds a predetermined maximum, say two to five miles an hour, sufficient pressure will be built up on the discharge side of the pump to flex the diaphragm 41 to actuate the crank 17 to hold the check valve open. Under this condition, the braking fluid may return to the master cylinder so as to release the brakes. In other words, the brakes may be applied and released at will when the check valve 11 is unseated. The pump unit is entirely closed and contains a small quantity of a liquid the viscosity of which will not be materially affected by temperature changes. This control serves to prevent applying and locking the brakes when the vehicle is moving in excess of a predetermined speed. Due to the lost motion connection between one end of the crank 17 and the link 30, it will be seen that the position of the accelerator pedal does not interfere with the operation of the speed control. In other words, this control is operable and functions independent of the position of the accelerator.

The check valve 11 is also moved away from its seat whenever the accelerator pedal is depressed to increase the speed of the motor. The accelerator is of course normally moved to idling position by a spring 43. When the accelerator pedal is only slightly depressed, the crank 17 is turned sufficiently to actuate the cam 16 to move the check valve 11 away from its seat against the tension of the spring 13. The spring 32 serves to hold the crank 17 in position to be actuated by the accelerator pedal. As soon as the accelerator pedal is slightly depressed, the crank 17 is turned and the check valve unseated, so that the brakes will be automatically released. The amount of motion required to open the check valve 11 is only a small fraction of an inch and the crank 17 provides sufficient leverage for that purpose. With the check valve open, the brakes may be applied and released at will in a normal manner. It is of course to be understood that, if the speed of the vehicle is such that the speed control has unseated the check valve, the depression of the accelerator will have no effect on the check valve which would be then unseated. The check valve will be closed when the vehicle is stationary and the throttle closed. This enables the driver to leave the vehicle with the motor running at idling speed, with the assurance that the brakes will remain applied until the accelerator is again depressed to open the throttle.

It will now be clear that I have provided a fluid braking system for automotive vehicles and controls therefor which will accomplish the objects of the invention hereinbefore stated. It is to be understood that the embodiment of the invention herein disclosed is to be considered as merely illustrative, and not in a limiting sense, as various changes are contemplated and may be made in the details of construction and in the arrangement of parts without departing from the spirit of my invention. The invention is therefore limited only in accordance with the scope of the appended claims.

Having thus described my invention, what I claim is:

1. In a braking system for automotive vehicles, the combination of a motor for driving the vehicle; an accelerator for increasing the speed of the motor; means for applying the brakes of the vehicle; a device for maintaining said brakes applied, including, a movable member; means responsive to the speed of the vehicle for actuating said member for releasing said brakes; lever mechanism interconnecting said accelerator and said member for directly actuating said member by movement of said accelerator for releasing said brakes when the accelerator is moved to a motor speed increasing position; and means forming a lost motion connection between said accelerator and said member whereby said member may be actuated by said speed responsive means without affecting said accelerator.

2. In a braking system for automotive vehicles, the combination of a motor for driving the vehicle; an accelerator for increasing the speed of the motor; means for applying the brakes of the vehicle; a device for maintaining said brakes applied, including a movable member; means responsive to the speed of the vehicle for actuating said member for releasing said brakes; and lever mechanism interconnecting said accelerator and said member for directly actuating said member by movement of said accelerator for releasing said brakes when the accelerator is moved to a motor speed increasing position, whereby said device is controlled independently of operating conditions of the motor.

WILLIAM E. CHILTON.